United States Patent

Schafer

[15] 3,690,248

[45] Sept. 12, 1972

[54] SANITIZABLE PASTRY FOLDING MECHANISM

[72] Inventor: Leonhard Schafer, 2770 Briggs Ave., New York, N.Y. 10458

[22] Filed: April 19, 1971

[21] Appl. No.: 135,039

[52] U.S. Cl. ............... 99/450.2, 99/450.1, 99/450.6
[51] Int. Cl. ............................................. A21c 3/06
[58] Field of Search...... 99/450.6, 86, 92, 353, 450.1, 99/450.2, 450.3, 450.4, 450.5; 425/343, 383, 391

[56] References Cited

UNITED STATES PATENTS

| | | | |
|---|---|---|---|
| 2,969,025 | 1/1961 | Shafer | 425/383 |
| 3,257,973 | 6/1966 | Schafer | 425/383 |
| 3,390,646 | 7/1968 | Shafer | 99/450.6 |
| 3,420,194 | 1/1969 | Schafer | 99/450.2 |

*Primary Examiner*—Walter A. Scheel
*Assistant Examiner*—Arthur O. Henderson
*Attorney*—Frank Makara

[57] ABSTRACT

This invention relates to a spring-loaded mechanism adapted to cut and fold a pastry blanket having an edible filling thereon to produce danish pastry having a filling thereon. The mechanism consists of three parts, preferably made of stainless steel and consists of a cage having preferably more than one cell; a pastry folding mechanism having seperable spring-loaded flaps; and a lifter disposed over and partly through the folder mechanism for lifting the prepared folded-over danish pastry for removal. The cage is removably press fitted upon a slat of a conveyor chain consisting of a plurality of said slats, each having a cage thereon. The conveyor slats are not removable from the conveyor and are not a part of this invention. Each folder mechanism has a centrally disposed platform to which is fixed, preferably, two depending legs, which are disposed in frictional seizure relationship to co-acting apertures disposed in said slat to permit removal of the folder mechanism from the slat for cleaning. The lifter also is provided with a platform and two depending legs and is disposed over the folder mechanism platform and through apertures therein and thence into apertures in said slat for removal frictional seizure thereto.

5 Claims, 7 Drawing Figures

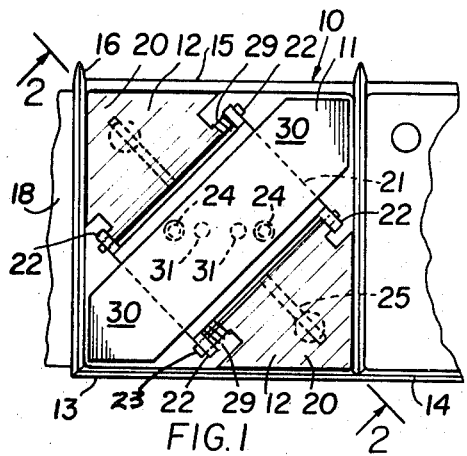
FIG.1
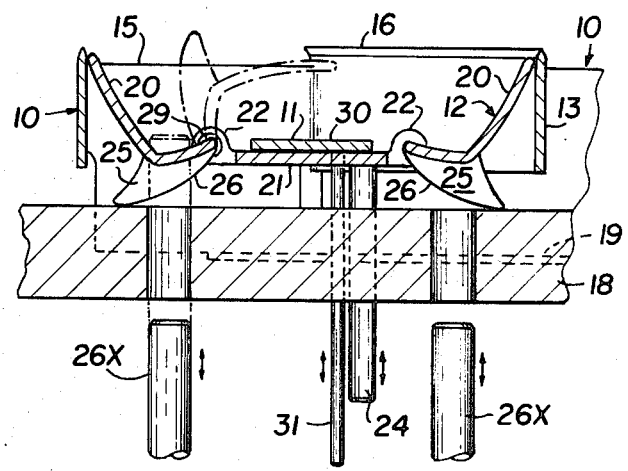
FIG.2
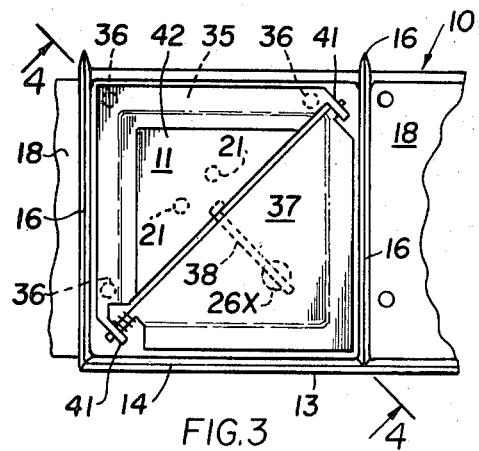
FIG.3
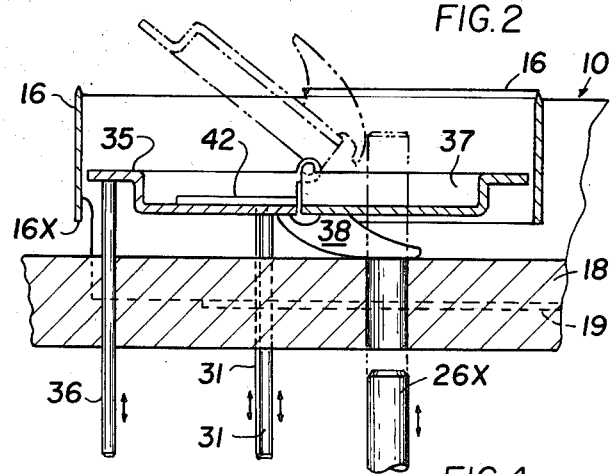
FIG.4
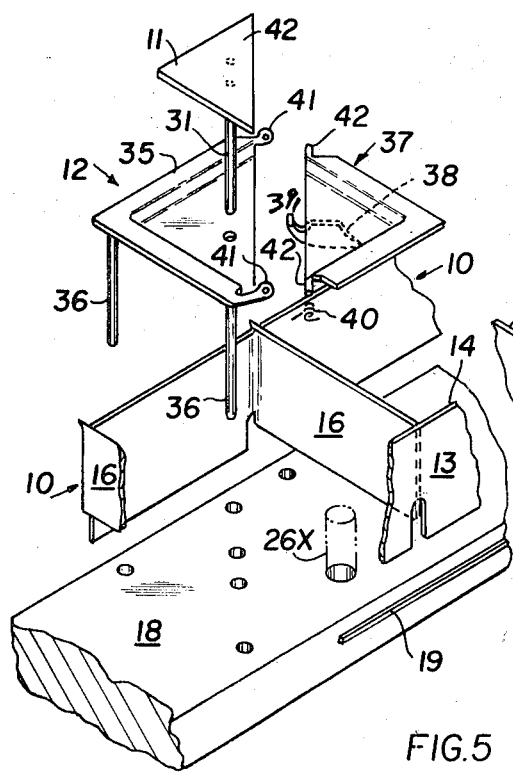
FIG.5
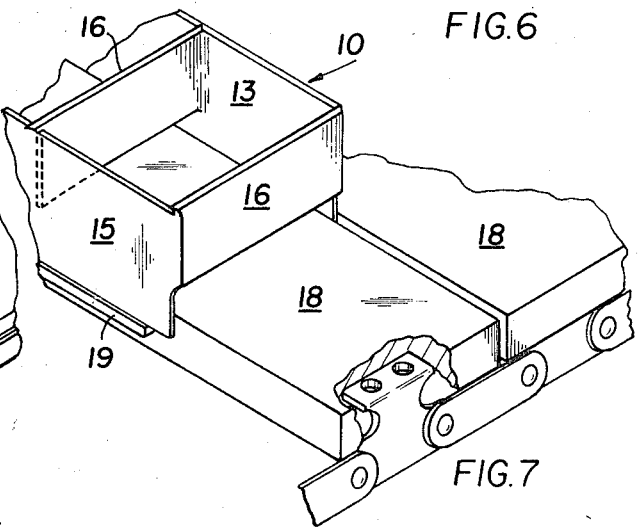
FIG.6
FIG.7

SANITIZABLE PASTRY FOLDING MECHANISM

The present high cost of Danish pastry is due to the high cost of the hand labor used to fold the dough blanket over the edible filling. The mechanism of this invention produces the folding operation. Moreover, the mechanism of three parts is removable for individual cleaning of the separated parts, and thus pass the sanitary codes of the health authorities.

As the statement of this invention, the invention is as set forth in the abstract of the disclosure. By way of further explanation of the invention, each of the rotatable folder flaps is provided on its under surface with a curved cam surface. This cam surface engages a pusher rod disposed through an aperture in the slat, so that upon upward movement of the rod the flap is turned over about one hundred and eighty degrees thereby disposing the dough blanket over the filling. Each flap is spring-loaded away from its platform or in outermost position.

This invention is described herein by means of a plurality of illustrative embodiments thereof and as shown in the drawing but it is not to be limited to these examples, FIG. 1 is a top plan view of the two-fold Danish pastry specie of this invention and showing an end cell of a cage of rectangular construction. Also there is shown the lifter plate platform disposed on the platform of the folder mechanism, said mechanism having a pair of opposed spring-loaded flaps disposed urgingly in opposed corners of the square cell, FIG. 2 is a section view taken on line 2—2 of FIG. 1 and showing the manner of engagement between the removable cage and a conveyor slat, in dotted outline, and showing the frictional seizure of the depending legs of the lifter and also of the folder mechanism in suitable apertures of said slat; and further showing slat apertures and pusher rods therefor to permit contact of the flap cam surface with said pusher rods, FIG. 3 is a top plan view of a single folder flap mechanism disposed interchangeably in the end cell of FIG. 1, FIG. 4 is a section view taken on line 4—4 of FIG. 3 and showing a cam shoe surface disposed over a pusher rod aperture of a slat and showing in outline the turned over folder plate, FIG. 5 is an exploded view of the specie of FIG. 3 and showing the cage removed from the slat, the folder mechanism also removed from the slat and the lifter also removed from frictional engagement from the slat of the conveyor, FIG. 6 is a top view of a four cell cage disposed alone on a conveyor slat, and FIG. 7 is an end view of the cage and conveyor slat showing the manner of connecting the slats into a conveyor.

Turning to the drawing, the three elements of this invention are all removable from their separate individual frictional seizure to the holding slat. The order of removal is first the lifter plate, then the folder mechanism and lastly the cage. The cage 10, the lifter plate 11 and the folder mechanism 12 are made of steam cleanable material such as stainless steel and function as a unit to produce a unitary result.

The cage 10 is provided with a forward or leading wall 13 having a sharp cutting top edge for cutting a dough blanket thereon when suitable pressure is applied. Also an inner wall 15 having no cutting or knife edge is provided to the cage. The cage is provided with transverse walls 16 disposed between the longitudinal walls to form cells. These transverse walls are welded in place, and are provided with cutting edges 14, and also provided with a spear point 16 to permit contact with a corresponding knife edge of an adjacent transverse wall of an adjacent cage. In this manner the dough blanket is unbrokenly cut along continuous lines so that neatly cut dough sheets fall into each cell.

The slats 18 of the conveyor are provided with a plurality of apertures of suitable size and predetermined location to receive the depending legs and the pusher rods, and with longitudinal ribs 19 to engage and seat the cage at a predetermined location. Thus all cutting edges 14 are disposed in a planar relationship on the topside of the conveyor.

The two-fold folder mechanism of FIGS. 1 and 2 is provided with two triangular curved upwardly flaps 20 normally disposed in opposed corners of the cell. The folder mechanism is provided with a centrally located platform 21 of rectangular shape. The four corners of the platform 21 are each provided with an apertured protuberance 22 adapted receive pins 23 of an adjacent flap.

Each folder platform 21 is provided with a pair of fixed legs 24 adapted to frictionally engage the walls of a receiving aperture in the slat 18. Preferably the legs 24 are jacketed in nylon plastic to obtain better frictional seizure. Each flap 20 is provided at its undersurface with a suitable cam 25 having a predetermined cam surface 26 adapted to slidingly engage a pusher rod 26X when the slat is at rest in the intermittent operation of the conveyor. The flaps 20 are rotated one at a time so that the there is an overlap of the corners of the dough blanket in the prepared pastry. The flaps are each provided with a coil spring 29 disposed upon a pin made from the flap material and integral therewith. The ends of the coil spring are biased against the rotatable flap and the platform 21 in such a manner that the flap is constantly urged in its corner seated position with the cam 25 disposed over the aperture through which the pusher rod 26X is forced at the appropriate intermittent station.

After the dough is folded over the filling, the cage is moved to another station or stop location and the pastry on the lifter plate 30 is lifted to the rim of the cell. To effect this result the lifter plate 30 is provided with a pair of depending fixed legs 31 that extend through apertures in the slat 18 and engage a lifter bar (not shown) that forces the legs 31 and plate 30 upwardly to permit hand removal of the prepared pastry.

Turning now to FIGS. 3 to 5, there is shown a single turnover specie wherein one half of the square dough blanket is turned over on the diagonal line. In this form of the invention the platform 35 is provided with three fixed depending legs 36. Preferably the platform 35 is recessed to provide for a larger filling and a better linear contact of the turned over dough. The flap 37 is of a construction similar to platform 35 to effect a good mating of the prepared pastry at the sealing edges. Flap 37 is provided with a cam 38 having an extension portion 39 that stops the flap 37 and thus produces a planar alignment of the flap 37 to the platform 35 and a large recessed filling pocket. Spring 40 urges the flap 37 continuously in open or planar position. The platform 35 is also provided with apertured protuberances 41 into which the integral pins 42 of the flap are disposed. The coil spring 40 continuously urges the flap 37 into planar relationship to the platform 35. The lifter plate 42 is of triangular configuration and lifts the triangular prepared turnover thereon upon lifting operation of the rods 31 by a bar (not shown). Preferably the lifters 11 are provided with two holding rods 31 in order to avoid rotation and unwanted motion.

Preferably the transverse walls 16 do not extend to engage the slat 18. Thus the end walls 16 are provided with an edge 16X that permits a hand to be inserted thereunder to lift the cage 10.

I claim:

1. A removable sanitizable pastry folding mechanism comprising a cage of open cellular construction having a pair of longitudinal spaced-apart walls interconnected with a plurality of transverse walls therebetween forming at least one cell and adapted to frictionally and removably engage a longitudinal conveyor slat; a folder mechanism having at least one spring-loaded flap mounted swingably to a folder platform and having at least one depending leg frictionally and removably engaging the co-acting wall of an aperture disposed in said slat; and a lifter unit having a lifter platform and at least one depending leg fixed thereto and passing through aperture disposed in said folder platform and into an aperture in said slat for frictional removable engagement to it, whereby a pastry blanket having an edible filling thereon is mechanically folded over said filling and thereafter lifted to the rim of said cell for removal therefrom.

2. The folding mechanism of claim 1 wherein the transverse and forward wall of said cage are each provided with cutting edges and said flaps are each provided with depending cams having sliding curved surfaces thereon, said flaps being spring-loaded and biased continuously away from the folder platform, whereby upward movement of a pusher rod through a suitable aperture in said slat slidingly engages the cam surface of said cam to rotate said flap and the portion of the cut dough blanket thereon through an arc of about 180°.

3. The mechanism of claim 2, wherein said folder mechanism comprises a centrally disposed rectangular platform having opposed apertured protuberances at each corner thereof; a pair of flaps secured respectfully to each side of opposed protuberances of said platform and having integral pins thereon engaging the protuberances of said platform and disposed in opposed corners of a cell; whereby a two fold pastry making mechanism is made and operable in each cell.

4. The mechanism of claim 2 wherein said folder mechanism is adapted to prepare single folded pastry comprising a diagonal edge triangular platform disposed diagonally in one half of the area of a square cell and having an apertured protuberance at each end of the diagonal edge of the triangular platform; and a triangular flap having a diagonal edge disposed adjacent the diagonal edge of said platform and provided with integral pins to engage the apertures of said protuberances rotationally, said flap having a cam having an extension portion extending beyond the flap diagonal edge to engage the undersurface of said platform whereby the spring-loaded flap is normally disposed in planar relationship to said platform.

5. The mechanism of claim 4 wherein the platform and the flap are each provided with a recessed area to provide sealing rims for sealing in the filling of turnover pastry.

* * * * *